United States Patent [19]

Bignell

[11] 4,301,838
[45] Nov. 24, 1981

[54] MODULAR CONDUIT UNIT

[75] Inventor: Evan S. W. Bignell, Montreal, Canada

[73] Assignee: Domtar Inc., Montreal, Canada

[21] Appl. No.: 898,410

[22] Filed: Apr. 20, 1978

Related U.S. Application Data

[63] Continuation-in-part of Ser. No. 757,341, Jan. 6, 1977, abandoned.

[51] Int. Cl.³ .............................................. F16L 9/18
[52] U.S. Cl. .................................................. 138/112
[58] Field of Search ................ 138/111, 112; 29/413; 285/188

[56] References Cited

U.S. PATENT DOCUMENTS

| | | | |
|---|---|---|---|
| 1,799,673 | 4/1931 | Burke et al. | 138/112 |
| 1,801,451 | 4/1931 | Parker | 138/112 |
| 1,804,478 | 5/1931 | Parker | 138/112 |
| 2,039,387 | 5/1936 | Burke et al. | 138/112 |
| 3,526,934 | 9/1970 | Owen | 138/111 X |
| 3,542,266 | 11/1970 | Woelfle | 29/413 |

Primary Examiner—Charles E. Phillips
Attorney, Agent, or Firm—C. A. Rowley

[57] ABSTRACT

The modular conduit unit formed from at least four conduits secured together in spaced relationship by means of a plurality of spaced star-shaped spacer elements. The star-shaped spacer elements are each formed with four equally spaced hollow projections that terminate in end walls and have curved side walls. The curved side walls of adjacent projections merge to form outer walls of the element that are in the form of cylindrical segments. An integral reinforcing member interconnects said outer walls at points spaced from said end walls and a line of weakness is found in each of said end walls and extends substantially longitudinally of the cylindrical segments. The line of weakness facilitates breaking of the star-shaped member for replacement of a conduit.

6 Claims, 5 Drawing Figures

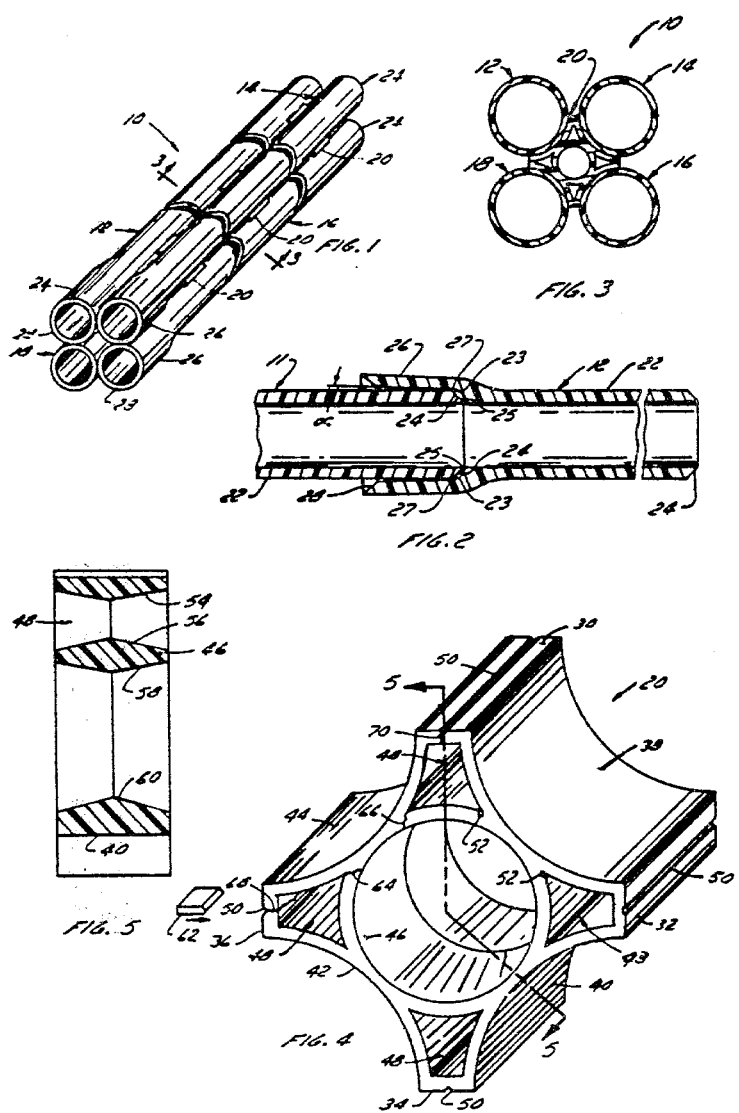

MODULAR CONDUIT UNIT

This application is a continuation-in-part of application no. 757,341 filed Jan. 6, 1977 now abandoned.

FIELD OF THE INVENTION

The present invention relates to a star shaped connector and a modular conduit formed therewith. More particularly the present invention relates to a connecting star for pre-assembled modular conduit unit wherein a plurality of discrete conduits each having an integral bell coupling at one end of the unit are preassembled in a specific relationship.

DESCRIPTION OF THE PRIOR ART

The term modular or multiple conduit unit as used herein is intended to describe a conduit unit that is preassembled from a plurality of discrete conduits secured together in spaced relationship and then delivered to the construction site where it is to be installed, rather than a conduit assembly that is fabricated on site as it is installed.

In the earlier attempts to provide multiple conduit assemblies, it was not conventional to form pre-assembled multiple conduit units, rather, the individual conduits were assembled on site to form a multiple conduit assembly. However, some of the patent literature indicates that it was conceived that such assemblies could have been pre-assembled. U.S. Pat. No. 2,039,387 issued May 5, 1936 to Burke discloses one type of arrangement wherein the conduits are spaced using a specific star shaped spacer member and are straped together. A similar arrangement showing a different star shaped spacer is shown in the Burke et al U.S. Pat. No. 1,799,673 issued Apr. 7, 1931. Parker has invented several systems for inter-connecting a plurality of conduits into an assembly as shown, for example, in U.S. Pat. Nos. 1,801,451 issued Apr. 21, 1931 and 1,804,478 issued May 12, 1931.

The arrangement shown in U.S. Pat. No. 3,872,894 issued May 24, 1975 to Streit has been tried, but the invention has gained little commercial acceptance. It is sometime essential to pneumatically feed a line through each individual conduit so that a pulling line may be threaded and then the transmission cables pulled therethrough.

A further major problem, when a pre-assembled modular unit is made, is breakage occuring during shipment i.e. on occasion one more of the conduits in a multiple conduit unit may break. It is then essential to eliminate this conduit and substitute new one therefore. With the prior art assemblies such substitution (since assembly was generally made on site) would not be necessary since a broken pipe or conduit simply would not be used. When pre-assembled modular units are shipped from the factory the problem of substituting a single conduit into a unit must be solved. In all of the earlier patents no satisfactory arrangement has been disclosed that would make such a substitution feasible without dismantling the whole of the conduit unit.

BRIEF DESCRIPTION OF THE PRESENT INVENTION

It is the object of the present invention to provide a multiple conduit unit wherein discrete conduits may be easily replaced without dismantling the remainder of the modular conduit unit.

It is the further object of the present invention to provide a discrete star-shaped spacer for securing the conduits together in spaced relationship and that may be broken to release a selected conduit.

Broadly the present invention comprises; a modular conduit unit composed of at least four cylindrical conduits secured together in spaced relationship with their longitudinal axes substantially parallel by at least three spaced star-shaped spacer elements interposed between the conduits, each said star-shaped spacer elements being provided with a four equally spaced hollow projections that terminate in end walls and have curved side walls, the curved side walls of adjacent projections merging to form outer walls in the form of cylindrical segments, an integral reinforcing member interconnecting said outer walls at points spaced from said end walls, a line of weakness in each of said end walls extending substantially axially of said cylindrical segments, the outer walls being adhesively secured in face-to-face relationship with the outer surfaces of said conduits. The conduits preferably are all of the same length and have their opposite ends faces aligned in planes substantially perpendicular to the longitudinal axes of said conduits and adjacent the ends of said conduits in one of said planes each being formed with an integral bell coupling.

Further features, objects and advantages will be evident from the following detailed description of the preferred embodiments of the present invention taken in conjunction with the accompanying drawings in which:

FIG. 1 is an isometric view of a multiple conduit unit constructed in accordance with the present invention.

FIG. 2 is a longitudinal section showing coupled together a pair typical conduit elements for use in the unit illustrated in FIG. 1.

FIG. 3 is a section along the line 3—3 of FIG. 1.

FIG. 4 is an isometric view of a star-shaped spacer element constructed in accordance with the present invention and FIG. 5 is a section along the line 5—5 of FIG. 4 illustrating the cross-sectional shape of the star-shaped element.

Referring to FIG. 1, there is shown a multiple conduit unit 10 composed of a plurality of discrete conduits 12, 14, 16 and 18 secured together by a plurality of spacer elements 20 of substantially star-shaped cross section (3 illustrated) that will be described in more detail hereinbelow.

The conduits are all substantially the same as conduits 11 and 12 as illustrated in FIG. 2. Conduit 12 as shown is composed of a long cylindrical section 22 terminating at one end in a inwardly tapering bevel 24 and formed at its opposite end with a bell coupling 26. Bell coupling 26 is formed with an outwardly bevelled edge 28 and has its inner surface tapering from a maximum diameter at its mouth at an angle relative to the longitudinal axes of the conduit. The beveled edge 24 of the mating conduit 11 is snugly received within the coupling 26 and is driven in so that the beveled edge 24 provides clearance to accommodate the fillet 23 on the inside bar of the coupling 26 and two spaced seals 25 and 27 at the end of the conduit 11 and about the outer periphery of the conduit 11 adjacent the bevelled edge 24 respectively.

The star-shaped spacer elements 20 are extremely important to the present invention and provide substantially the sole means of spacing and inter-connecting the various conduits 12, 14, 16 and 18 forming the conduit unit 10. As shown in FIG. 4, the star-shaped spacer element 20 is in the form of a four-pointed star, i.e. is provided with four equally spaced hollow points or projections each terminating in a substantially planer face or wall 30, 32, 34, 36. These faces 30, 32, 34, 36 are inter-connected by cylindrical segments 38, 40, 42, 44 that form the outer walls of the projections substantially as shown. The cylindrical segments 38, 40, 42 and 44 have substantially the same curvature as the outer surfaces of the conduits 12, 14, 16, 18 so that the outer surfaces of the conduits are received in face-to-face relationship with the segments 38, 40, 42, 44.

Each star-shaped element is strengthened by an integral substantially cylindrical internal section 46 having its cylindrical axis aligned with the axis of the star-shaped member. This cylindrical section 46 inter-connects the cylindrical segments 38, 40, 42 and 44 at a point spaced from the end walls 30, 32, 34 and 36 and preferably at the points of minimum spacing between opposed cylindrical segments. It will be noted that each projection or point of the star is hollow and has a hollow area 48 which determines the thickness of the planer end walls 30, 32, 34, 36 and of the cylindrical section 46, and of the cylindrical segments 38, 40, 42, 44 between the points of contact of the cylindrical section and the cylindrical segments. Obviously these walls will be as thin as possible commensurate with the request strength of the star.

Each of the end walls 30, 32, 34, 36 is provided with a longitudinally extending line of weakness 50. The star-shaped spacer is also weak at each end of the junction or point of contact between the cylindrical section 46 and the cylindrical segments 38, 40, 42, 44. These weak points facilitate and ensure the star breaks more easily and in the proper places to permit complete removal of a broken conduit as will be described in more detail hereinbelow. It may be desirable to provide a defined line of weakness in the walls of the cylindrical section 46 as indicated at 52 (show only on the top right hand corner cylinder 46) to ensure that fracture of the star-shaped element occurs neatly across the cylindrical section 46 when a conduit is to be replaced.

It is important that the cylindrical segments 38, 40, 42, 44 match closely with the outer periphery of the conduits 12, 14, 16, 18. Thus, if the star-shaped element is to be formed by injection moulding, such cylindrical surfaces are not easily obtained since tapers to provide mould clearances are required to obtain mould separation. In an injection moulded element the inner surfaces of the star-shaped element i.e. the inner surfaces in the spaces 48 and the inner surface of the cylindrical section 46 are tapered as indicated at 54, 56, 58 and 60 in FIG. 5 to a maximum thickness preferably at the centre of the star while the outer surface of the segments (e.g. segment 40 as shown) are substantially parallel to the longitudinal axis of the star.

The modular unit 10 is formed by securing by adhesive the plurality of conduits 12, 14, 16, 18 to a plurality of stars 20. Adhesive is applied to the surfaces 38, 40, 42, 44 of the stars (generally a solvent type adhesive) and the conduits are secured to the star. It is important that the stars be spaced from the free end of the conduit to permit flexing the free ends sufficient to permit alignment of the conduits so that the coupling elements 26 may slide over the bevelled edges 24 of the conduits in the adjacent unit. After a conduit unit has been assembled, as illustrated in FIG. 1, it is shipped to the site where as above indicated the plurality of such conduit units are arranged in end-to-end relationship with the bell coupling at one end encircling the end of the conduit having the bevelled edge 24 thereby to couple the conduits together.

In some cases, an individual conduit is broken in transit or on the work site and it is necessary to replace the broken conduit. This is accomplished with the present invention by taking a pointed tool such as the tool 62 illustrated in FIG. 4 and driving it in the lines of weakness 50 on opposite sides of the conduit to be replaced thereby to fracture the end walls of the star-shaped element 20 on opposite side of the conduit i.e. in the illustrated arrangement it could be at end walls 30 and 36 assuming the broken conduit is secured to the cylindrical segment 44. The cylindrical section 46 is then also broken out in the area bounded by the space 48 in each of the projections of the star on opposite sides of and immediately adjacent the point of contact of the section 46 with the segment face 44 e.g. as illustrated at 64 and 66, FIG. 4, i.e. the section of the star forming the cylindrical surface 44 will be broken out by breaking the line of weakness 50 on end face 36 as illustrated at 68; by breaking the line of weakness 50 in end face 30 as illustrated at 70 and breaking the cylindrical section 46 as indicated at 64 and 66 so that the whole segment 44 may be removed from the star 20.

When a conduit is to be substituted for one that has been broken and removed a star-shaped element with at least one of the points removed (e.g. by sawing the cylindrical segments forming opposite sides of the selected projection or point immediately adjacent their points of contact with the cylindrical section 46 to leave the section 46 intact while separating the projection) is inserted between the three conduits remaining in the unit and with two of its projection in a position to provide a cylindrical segment to receive the new or replacement conduit. The three pointed star is adhesively secured to all of the conduits thereby to secure the replacement conduit to the remaining conduits.

Points of the stars should be such that the surfaces or walls 30, 32, 34, 36 are in the plane formed by joining the longitudinal axis of the two conduits on either side of the point. Thus, if a plurality of units are to be stacked together, a star may be interposed between the two units in alignment with stars of the two units being stacked thereby to increase the strength of and ensure proper spacing of the conduits in the combined unit. This is not absolutely essential to the operation and the points may be made slightly shorter and/or the star not aligned with the stars of the two units being combined but the combined unit would not be quite as strong.

The unit 10 preferably will be composed of a minimum of 3 spacers 20, the number being dependent on the length of the conduits to be connected together. The end spacers 20 i.e. those adjacent the opposite ends of the conduit unit should be spaced between 6 and 24 inches from the ends of the conduit. If they are spaced any closer, there will not be sufficient flexibility to ensure alignment of conduits of adjacent units and if they are significantly greater spaced, there will be too much flexibility and the unit will not be easily coupled and handed.

The invention has been described in relation to a four conduit system but obviously where the system of six or eight may be used.

Also the central cylindrical section 46 may receive suitable conduits such as air hoses or the like that may be smugly received within the section 46.

Modifications may be made without departing from the spirit of the invention as defined in the appended claims.

I claim:

1. A modular conduit unit composed of at least four conduits secured together in spaced relationship with their longitudinal axis substantially parallel by at least 3 spaced star-shaped spacer elements interposed between the conduits, each of said star-shaped spacer elements being provided with four equally spaced hollow projections that terminate in an end wall and have curved side walls, said curved side walls of adjacent projections merging to form outer walls substantially in the form of circular cylindrical segments, an intergral substantially annular reinforcing member interconnecting said outer walls at points spaced inwardly from said end wall and defining an inner free space, said end wall, said curved side walls of each of said projections and said reinforcing member defining a free space in each of said projections, each of said end walls being provided with a line of weakness extending substantially axially of said cylindrical sections, the outer face of said cylindrical sections being in face-to-face relationship to and adhesively secured directly with said conduits and there being a weakness at each point of contact between said circular cylindrical segments and said annular member whereby a damaged conduit of said unit may be replaced by breaking the star-shaped spacer along the appropriate weakness areas.

2. A modular conduit unit as defined in claim 1 wherein said conduits are substantially all of the same lengths and have their opposite ends aligned in plane substantially perpendicular to the longitudinal axis of said conduits, each said conduits adjacent their end in one of said pianes being each formed with an integral bell coupling and the opposite ends being bevelled inwardly.

3. A modular conduit unit as defined in claim 2 wherein said points are the closest points on opposed cylindrical segments.

4. A modular conduit unit as defined in claim 3 wherein inner faces of said hollow projections defining said spaces and of said annular reinforcing member taper towards each other from the outer longitudinal ends of said star-shaped element toward the centre of said star-shaped element.

5. A modular conduit unit as defined in claim 1 wherein said points are the closest points on opposed cylindrical segments.

6. A modular conduit unit as defined in claim 5 wherein inner faces of said hollow projections defining said spaces and of said annular reinforcing member taper toward each other from the outer longitudinal ends of said star-shaped element toward the centre of said star-shaped element.

* * * * *